United States Patent
Ruhnau et al.

(10) Patent No.: US 6,622,077 B2
(45) Date of Patent: Sep. 16, 2003

(54) ANTI-LOCK BRAKING SYSTEM AND METHOD

(75) Inventors: Gerhard Ruhnau, Neustadt (DE); Gerald Stanusch, Harsum (DE)

(73) Assignee: WABCO GmbH & Co. OHG, Hannover (DE)

( * ) Notice: Subject to any disclaimer, the term of this patent is extended or adjusted under 35 U.S.C. 154(b) by 0 days.

(21) Appl. No.: 10/165,265

(22) Filed: Jun. 7, 2002

(65) Prior Publication Data
US 2003/0018424 A1 Jan. 23, 2003

(30) Foreign Application Priority Data
Jul. 20, 2001 (DE) .......................... 101 35 600

(51) Int. Cl.$^7$ ............................................. G06F 19/00
(52) U.S. Cl. ..................... 701/71; 701/70; 303/112; 303/121
(58) Field of Search ............... 701/71, 70, 80, 701/78, 81; 303/112, 121, 150

(56) References Cited

U.S. PATENT DOCUMENTS

| | | | | |
|---|---|---|---|---|
| 3,704,043 A | * | 11/1972 | Hickner et al. | 303/159 |
| 5,945,743 A | * | 8/1999 | Pattantyus et al. | 307/10.1 |
| 6,343,844 B1 | * | 2/2002 | McCann et al. | 303/122.02 |

FOREIGN PATENT DOCUMENTS

| | | |
|---|---|---|
| DE | 37 33 801 A1 | 3/1989 |
| DE | 39 28 651 A1 | 3/1991 |
| DE | 40 22 671 A1 | 1/1992 |
| DE | 195 08 559 A1 | 9/1996 |
| DE | 197 23 323 A1 | 12/1998 |
| DE | 198 54 788 A1 | 5/2000 |

OTHER PUBLICATIONS

"ABS/ASR 'D'—'Cab' Version Anti–Blockier–System für Nutzfahrzeuge," WABCO Standard GmbH 1999.

* cited by examiner

Primary Examiner—Marthe Y. Marc-Coleman
(74) Attorney, Agent, or Firm—Kramer Levin Naftalis & Frankel LLP

(57) ABSTRACT

An anti-lock braking system (ABS) for multi-axle vehicles equipped with multiple wheel-speed sensors and modulators for adjustment of braking pressure. The brake cylinder for each wheel may be controlled by an individual modulator, or, alternatively, a single common supply axle modulator may regulate both brake cylinders of an axle. In a preferred embodiment, the ABS is controlled by an ABS electronic control unit (ECU), which has four regulating channels with four corresponding end stages for controlling three modulators, where one of the modulators is commonly regulated by two end stages. The ECU also detects whether it is coupled to a proper ABS. The ABS electronic control unit eliminates the danger of an undetected installation of an ABS electronic control unit into an incompatible anti-lock braking system.

46 Claims, 4 Drawing Sheets

ANTI-LOCK BRAKING SYSTEM AND METHOD

BACKGROUND OF THE INVENTION

The present invention relates generally to an anti-lock braking system (ABS) and, in particular to an anti-lock braking system wherein a single electronic control unit (ECU) can be used with alternative ABS arrangements and configurations.

Anti-lock braking systems function to prevent the locking of individual wheels of a vehicle while the vehicle is braking, and thus to shorten the braking distance of the vehicle while maintaining lateral traction, particularly when braking on smooth road surfaces. In order to brake a utility vehicle such as a truck, tractor, trailer or the like, a braking medium, such as compressed air, is normally injected at a controlled rate into the brake cylinder, thus actuating the respective wheel brakes. In brake units equipped with anti-lock braking systems, braking-pressure modulators (e.g. solenoid valves) are incorporated into the pneumatic lines. The modulators can be actuated by an ABS electronic control unit to decrease, maintain or increase the braking pressure. Accordingly, the modulators each contain one inlet valve (for increasing pressure) and one outlet valve (for decreasing pressure).

There are a number of distinct anti-lock braking systems known within the art. Utility vehicles can have one, two, three or more axles. Typically, two wheels are allocated to each axle, although more may be provided. These wheels may or may not be sensed (i.e., equipped with wheel-speed sensors). Each wheel brake may be provided with its own modulator, or one common modulator may serve multiple wheel brakes corresponding to an axle. A common modulator ensures that both wheels of an axle receive the same braking pressure. There are several anti-lock braking regulation schemes that are known within the art. These regulation strategies include select-low regulation (SL), select-high regulation (SH), modified axle regulation (MAR) (see, for example, German Patent 37 22 801), and variable axle regulation (VAR) (see, for example, German Patent 197 23 323).

There are two anti-lock braking systems which are most common for utility vehicles with two axles (a front axle which may be articulated and a rear axle).

The first common system consists of four wheel-speed sensors and four braking-pressure modulators (i.e., one wheel-speed sensor and one braking-pressure modulator for each wheel). This system is known as individual regulation (IR), as each of the wheels of the vehicle can be regulated individually. The system is also known as the 4S/4M system, corresponding to the number of wheel-speed sensors (S) and the number of braking-pressure modulators (M).

The second common anti-lock braking system for a two-axle utility vehicle consists of four sensors and only three modulators and is known as a 4S/3M system. In 4S/3M systems, one of the axles is equipped with two modulators, while the brake cylinders of the other axle are supplied commonly by a single modulator, via what is known as a common axle modulator. The commonly supplied axle can be either the front or rear axle of the vehicle (see WABCO ABS/ASR Brochure "D"-"CAB" Version, August 1999, p. 9).

A third, less widely used, system for two-axle utility vehicles consists of four wheel-speed sensors, but only two modulators (4S/2M). In 4S/2M systems, each axle is supplied commonly by one axle modulator.

Various embodiments of electronic ABS control units are known for the aforementioned three systems: specifically, ECUs with four regulating channels for the 4S/4M system, ECUs with three regulating channels for the 4S/3M system, and ECUs with two regulating channels for the 4S/2M system. In this context, a regulating channel is the components and signals between the wheel speed sensor and an output amplifier or end stage of the modulator for a wheel. These known embodiments of electronic ABS control units are similar in design, the only difference being that the respective unnecessary end stages are not included in the 4S/3M and the 4S/2M versions (i.e., these have only two or three end stages instead of the four end stages in a 4S/4M system).

Further variations of the ABS electronic control units include systems where the individual axle modulator is disposed on the front or rear axle of the vehicle. The previously listed regulation schemes known as MAR and VAR also multiply the number of possible versions of the ABS electronic control units (e.g., a 4S/3M anti-lock braking system may employ either MAR or VAR).

A consequence of the number of distinct and incompatible ABS electronic control units is that it becomes necessary to maintain a large inventory of different versions of ABS electronic control units. As a result, higher production and warehousing costs are incurred. This is especially problematic when individual versions are sold only in limited quantities.

In certain situations, the known 4S/3M ABS electronic control units may be installed mistakenly in a vehicle equipped with a 4S/4M ABS system. If such a 4S/4M vehicle is properly connected via the associated cable harness to the 4S/3M electronic control unit, the electronic control unit recognizes the superfluous modulator and transmits an error signal. The plug-and-socket connector between the cable harness and the ABS electronic control unit is the same for both systems. If, however, the connecting plug for the fourth modulator is not inserted, the 4S/3M electronic control unit would only detect three modulators, and thus would erroneously recognize a valid system and deliver unsuitable regulating signals (SL) for the second modulator of the axle during regulated braking. As a result the vehicle may not brake properly.

Accordingly, it is desired to provide an improved ABS electronic control unit that is compatible with a variety of anti-lock braking systems and eliminates the need for maintaining a large inventory of different ABS electronic control units for the multitude of anti-lock braking systems. It is also desired to provide an improved anti-lock braking system that eliminates the above described risks from mismatching vehicles with incompatible ABS ECUs.

SUMMARY OF THE INVENTION

An anti-lock braking system, method, and an electronic control unit are provided that allow for the use of a single electronic control unit in a variety of anti-lock braking systems and obviate the shortcomings in the prior art.

In a first aspect of the present invention, an anti-lock braking system is provided for wheeled vehicles having multiple axles. The system includes at least one modulator per axle coupled to at least one brake cylinder for controlling braking pressure. The system also includes wheel-speed sensors, and a multi-channel electronic control unit for selectively controlling the modulators. At least one modulator may be commonly activated by two channels of the electronic control unit.

In another aspect of the present invention, an electronic control unit having multiple channels for controlling an anti-lock braking system including modulators, speed sensors, and means for coupling the modulators and speed sensors to the electronic control unit such that two channels of the multiple channels control a single modulator is provided. The electronic control unit comprises programmable storage means for recognizing the type of anti-lock braking system to which it is coupled based on the means for coupling.

In yet another aspect of the present invention, a method for controlling an anti-lock braking system having speed sensors and modulators coupled to an electronic control unit having multiple channels, each channel having at least one end stage is provided. The method comprises the steps of recognizing the type of anti-lock braking system that the electronic control unit is coupled to and selecting an anti-lock braking regulation scheme based on the recognized type of anti-lock braking system.

The present invention provides an improved anti-lock braking system and ECU that is compatible with a variety of anti-lock braking systems and eliminates the need to maintain a large inventory of different ABS ECUs for the multitude of ABS systems. Accordingly, the inventory, production, warehousing and other costs of maintaining multiple versions of ABS electronic units are eliminated. The present invention also provides an improved anti-lock braking system that eliminates the above described risks from mismatching vehicles with incompatible ABS electronic control units.

Accordingly, it is an object of the present invention to provide an improved anti-lock braking system and method.

Another object of the present invention is to provide an electronic control unit which can sense the type of anti-lock braking system to which it is coupled and react accordingly.

Another object of the present invention is to provide an anti-lock braking system equipped with such an electronic control unit.

A further object of the present invention is to provide an anti-locking braking system which overcomes the problems associated with the prior art.

Still other objects and advantages of the invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
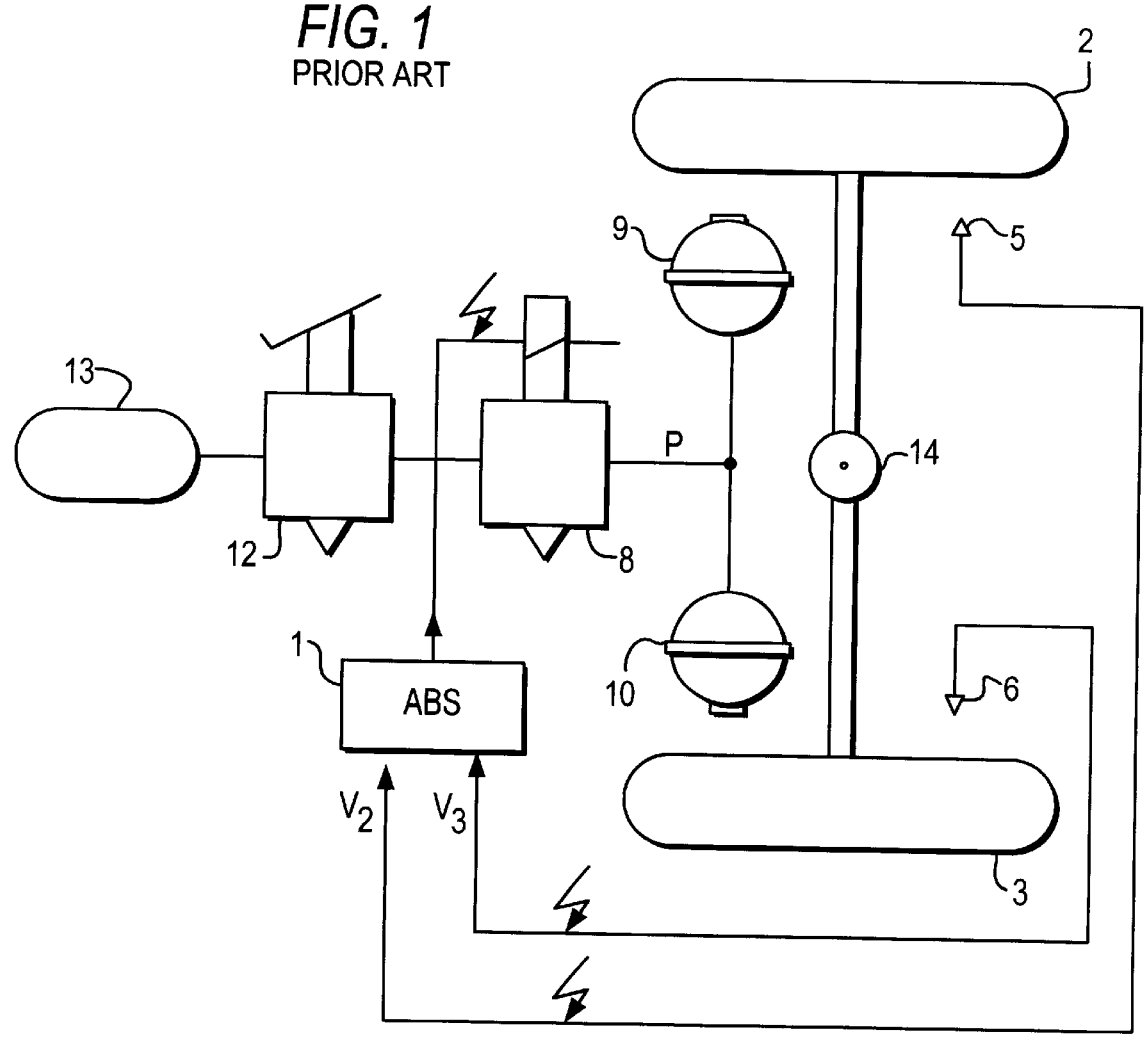
FIG. 1 illustrates, in schematic diagram form, the pneumatic and electrical component parts of an anti-lock braking system for a vehicle in which only one axle is shown (a 2S/1M system)

Reference is made to the drawing figures where like reference numerals are used for corresponding parts.

FIG. 1 shows a schematic diagram of a 2S/1M anti-lock braking system for one axle (14) of a utility vehicle. The second axle (not illustrated) of such a vehicle is typically equipped with a 2S/2M system, the vehicle as a whole having a 4S/3M system. Alternatively, in a 4S/2M system vehicle, the second axle is also equipped with a 2S/1M system.

The wheels (2, 3) belonging to axle (14) are equipped with wheel-speed sensors (5, 6). The wheel-speed sensors (5, 6) transmit their speed signals (V2, V3) to an ABS electronic control unit (ECU) (1). The electronic control unit (1) activates selectively a modulator (8), by which the braking pressure (P) in the two brake cylinders (9, 10) can be increased, decreased or maintained as needed. The braking medium, which is usually compressed air, is enclosed in a reservoir (13) and can be delivered by the vehicle driver to the brake cylinders (9, 10) via a brake valve (12). Other braking media, such as hydraulic fluid, or brakes applied by electric motors can also be used. The basic mode of operation of ABS in general is known in the art.

Figure 2:
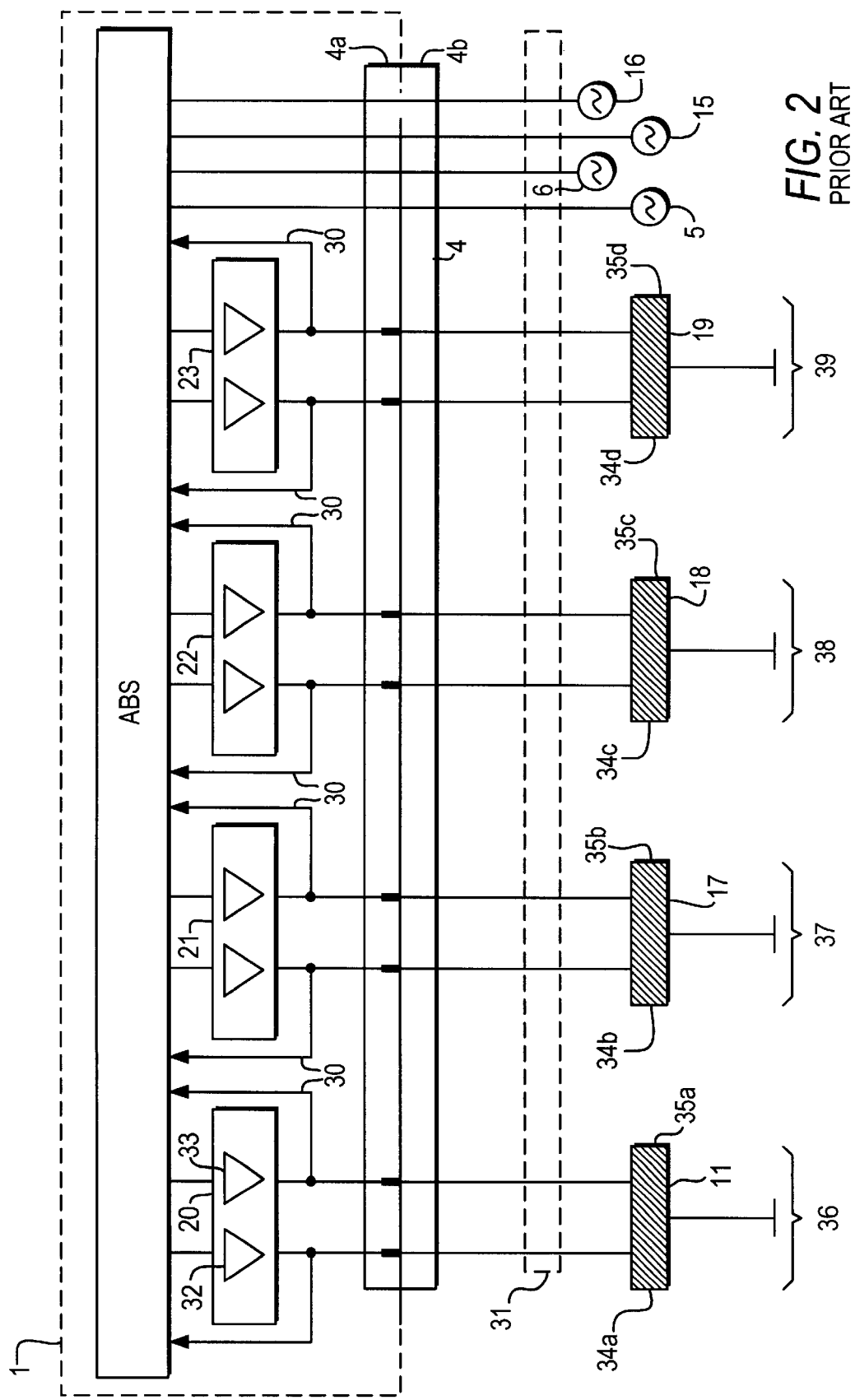
FIG. 2 illustrates, in block diagram form, the electronic component parts of a four-channel ABS with four modulators (a 4S/4M system)

Referring now to FIG. 2, the electronic control unit of a prior art four-channel ABS is illustrated in block diagram form. The ABS is coupled to four wheel-speed sensors and four modulators (4S/4M) and is provided internally with four end stages (20, 21, 22, 23). Each end stage includes two amplifiers (32, 33) one for the inlet valve (34) and one for the outlet valve (35) of the corresponding coupled modulators (11, 17, 18, 19). The output lines of the amplifiers are coupled via feedback lines (30) to the electronic circuitry of the ABS, whereby the status of the output lines can be sensed. Such feedback lines are known in the art (see, for example, German Patent 3928651). Thus, the ABS ECU (1) can detect if it has been coupled to an incorrect vehicle system, such as one with only three modulators (4S/3M), when it receives no status information from one of its lines (i.e., the four channel ABS ECU expects status signals from four modulators). The ABS ECU (1) can then warn the driver by activating a warning light or other signal in the cab or elsewhere. The feedback lines (30) are also used for monitoring end-stage errors and loads. The ABS also receives signals from the four wheel-speed sensors (5, 6, 15, 16).

All ABS connecting lines run through a plug-and-socket connector (4), the socket (4a) of which is fixed securely on the housing (indicated by broken lines) of the ABS ECU (1), while a plug (4b) is mounted on a cable harness (31). The plug-and-socket connector has a uniform configuration for all versions of the ABS. Alternatively, it is possible to use a plurality of individual plugs in the place of plug (4b). Modulators (11, 17, 18, 19) and wheel-speed sensors (5, 6, 15, 16) are coupled to the other end of cable harness (31). The connection between the cable harness and the modulators (11, 17, 18, 19) and sensors (5, 6, 15, 16) is also achieved with plug-and-socket connectors.

Each modulator (11, 17, 18, 19) includes an inlet valve (shown respectively as 34a–34d) and an outlet valve (shown respectively as 35a–35d), which are electromagnetically actuated. The modulators are located in the vicinity of the wheels, at the front left (36) and front right (37) positions for the front axle modulators and at the rear left (38) and rear right (39) positions for the rear axle modulators. Thus modulators (11, 17) are responsible for the front axle and modulators (18, 19) are responsible for the rear axle. The actuating coils of the modulators for the inlet/outlet valves (34a–34d, 35a–35d) are energized by their associated amplifiers (32, 33). The modulators (11, 17, 18, 19) are coupled to a common ground by their third leads. This ground connection can be achieved directly at the mounting point. Alternatively, a lead to a common grounding point can be achieved via cable harness (31) or an additional cable harness.

Figure 3:
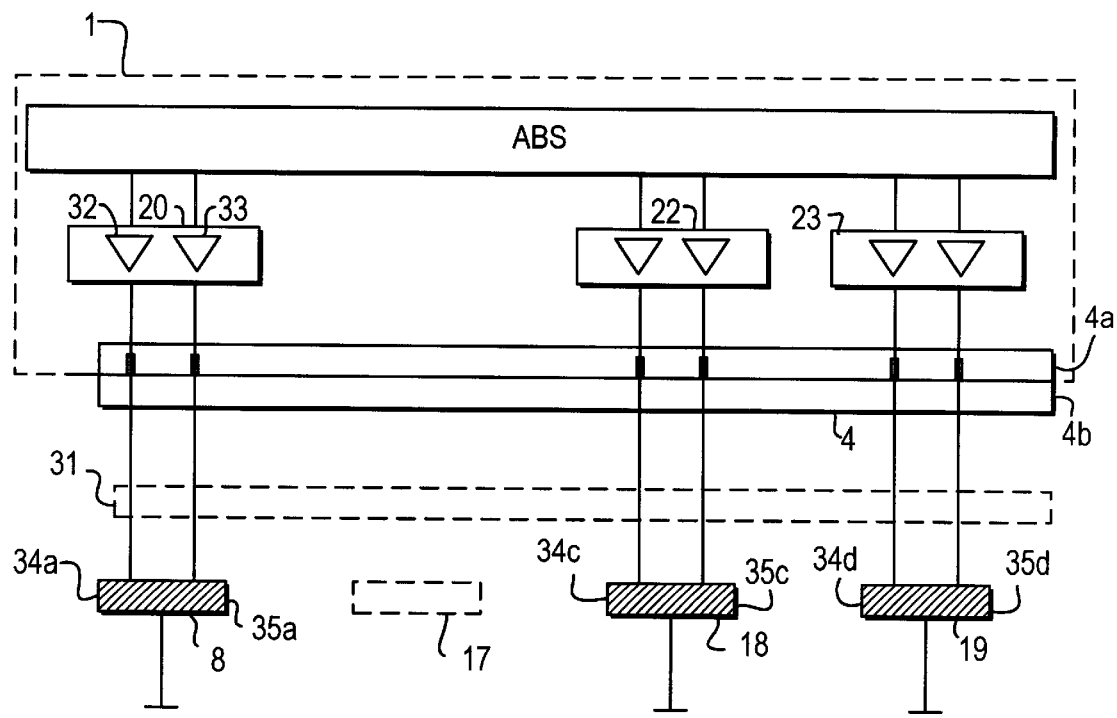
FIG. 3 illustrates, in block diagram form, the electronic component parts of a three-channel ABS, with three end stages and modulators (a 4S/3M system)

Referring now to FIG. 3, a prior art 4S/3M ABS is illustrated in block diagram form. The electronic circuitry thereof corresponds to that of FIG. 2, but in this case the end stage (corresponding to (21) in FIG. 2) for the missing modulator (17) (represented by broken lines) is not present. The common regulation of the front axle, which could, for example, be based on SL, is achieved in this case by axle modulator (8) (as in the anti-lock braking system described in connection with FIG. 1). For purposes of simplicity, the wheel-speed sensors and the feedback lines are not illustrated in FIG. 3, but are nevertheless present in the system.

The plug-and-socket connector (4a, 4b) that cable harness 31 is coupled to is identical to the plug-and-socket connector from FIG. 2. Further modulators (18, 19) are provided for individual regulation of the wheels of the rear axle. In this case, common axle modulator (8) is coupled to end stage (20), which in the pin assignment of the plug for a 4S/4M system (see FIG. 2) would be used for regulation of only the front left wheel of the front axle. However, in the case of the 4S/3M system depicted in FIG. 3, the end stage (20) is activated by the ABS with regulating signals that, according to one of the previously listed ABS regulation schemes, are suitable for common regulation of both wheels of one axle.

The cable harness (31) in FIG. 3 is specifically designed for the 4S/3M ABS, and it therefore contains only three modulator-activation lines for modulators (8, 18, 19). The ABS ECU (1) recognizes that the system to which it is connected is a compatible 4S/3M system.

However, in such a construction, if a defective ABS ECU is replaced in a repair shop, it is possible that a 4S/3M ECU (1) according to FIG. 3, might be mistakenly installed in a vehicle equipped with sensors and modulators for a 4S/4M system (as in FIG. 2). Such a system, with the associated four-channel cable harness (31) and fourth modulator (17), would then be connected via plug (4b) (which is uniform for all systems) to the 4S/3M ECU of FIG. 3. If this happened, the 4S/3M electronic unit (1) would detect the superfluous modulator (17) by means of an internal circuit arrangement (not illustrated) or programming and then activate an ABS warning light or other signal to alert the driver.

If, however, the plug-and-socket connector of the cable harness (31) for the fourth modulator (17) was not properly inserted (or not inserted at all), then the ECU (1) would erroneously recognize the system as valid, as it would only detect a 4S/3M system. As a result during a regulated braking process, the common regulating signals intended for an axle modulator (8) would be erroneously sent to wheel modulator (11) (see FIG. 2). In other words, signals intended for a common axle modulator, would instead be sent to the modulator for a single wheel. Thus proper regulation of the 4S/4M vehicle may not be achieved. Despite this potentially dangerous situation, the driver would not receive any warning from the ABS ECU (1).

Figure 4:
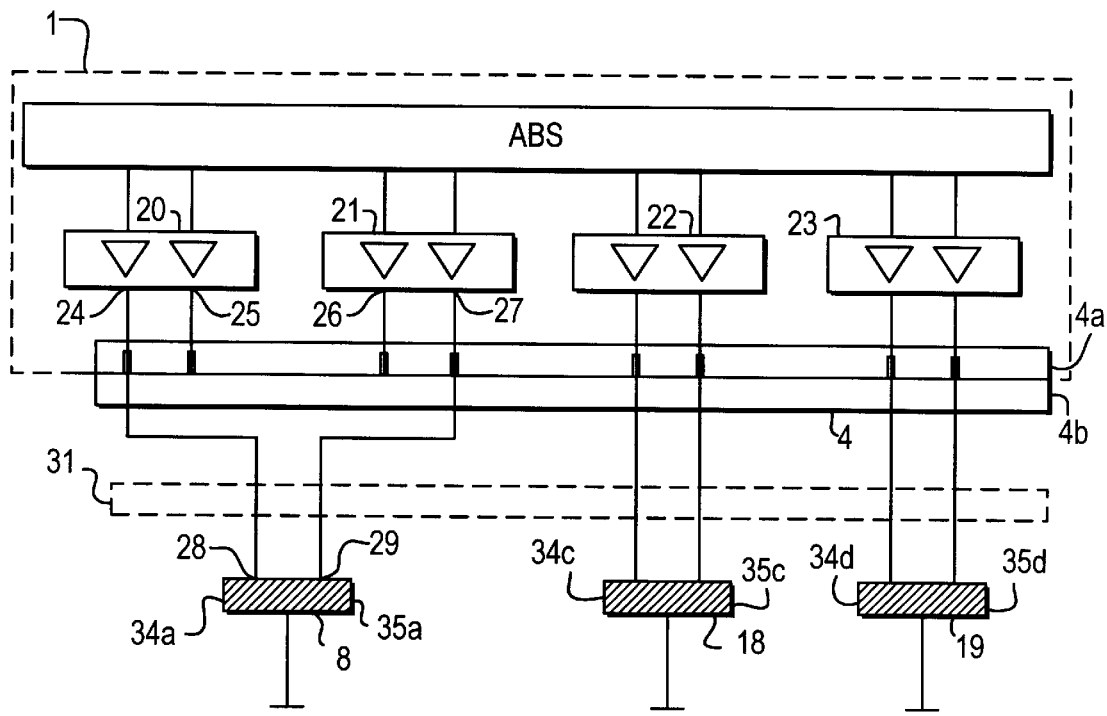
FIG. 4 illustrates, in block diagram form, the electronic component parts including end stages and modulators of a 4S/3M VAR ABS constructed according to the present invention.

Referring now to FIG. 4, an anti-lock braking system according to the present invention is illustrated in block diagram form. The ABS electronic control unit (1) of the preferred embodiment is suitable not only for 4S/4M vehicles, but also for 4S/3M and 4S/2M vehicles. In this figure, the ABS ECU (1) is coupled to a 4S/3M vehicle. With the present invention, the previously described possibility of failing to recognize an incompatible system is eliminated.

The inventive system according to FIG. 4 has an electronic control unit (1) in which, unlike the prior art ECUs described in FIG. 3, all end stages (20, 21, 22, 23) are installed (i.e., it has four channels). Furthermore, the system of FIG. 4 has a special 4S/3M cable harness (31) in which plug (4b) is wired such that the inlet valve 34a of axle modulator (8) is coupled via its electrical inlet-valve lead (28) to inlet-valve output (24) of end stage (20) of the first channel for the front axle. In contrast to the prior art system described in FIG. 3, the outlet valve 35a of the axle modulator (8) is coupled via its electrical outlet-valve lead (29) to outlet-valve output (27) of the now installed end stage (21) of the second channel for the front axle. The outlet-valve output (25) of end stage (20) and the inlet-valve output (26) of end stage (21) remain free.

The pin assignment of plug (4b) is signaled back to the ABS electronic control unit (1) via feedback lines thus activating the ECU's (1) internal programming to recognize that it is connected to a VAR 4S/3M ABS. The outlet valve (29) of axle modulator (8) is activated not by end stage (20), as would be the case in the prior art, but by the now installed end stage (21). Simultaneously, the logic of the ABS ECU (1) is set internally by the described wiring, such that axle modulator (8) is operated with a variable axle regulation scheme (VAR, see above).

The potential error case described previously for FIG. 3, can no longer occur, because an incorrectly connected cable harness of a 4S/4M system is recognized by feedback lines (30) and will generate an error signal, alerting the driver or technician. This is the case even if, as previously described, the connecting plug of modulator (17) is not inserted, since lead (25) of end stage (20) would then not be free, but would instead be coupled to the outlet valve of modulator (11) (compare with FIG. 2). Thus the mistaken installation of a 4S/3M electronic unit into a 4S/4M vehicle would not go undetected.

In a 4S/2M ABS, the two modulators (18, 19) of the rear axle would be replaced by a common axle modulator, which would be activated commonly by the two end stages (22, 23) in a manner analogous to that of axle modulator (8).

Figure 5:
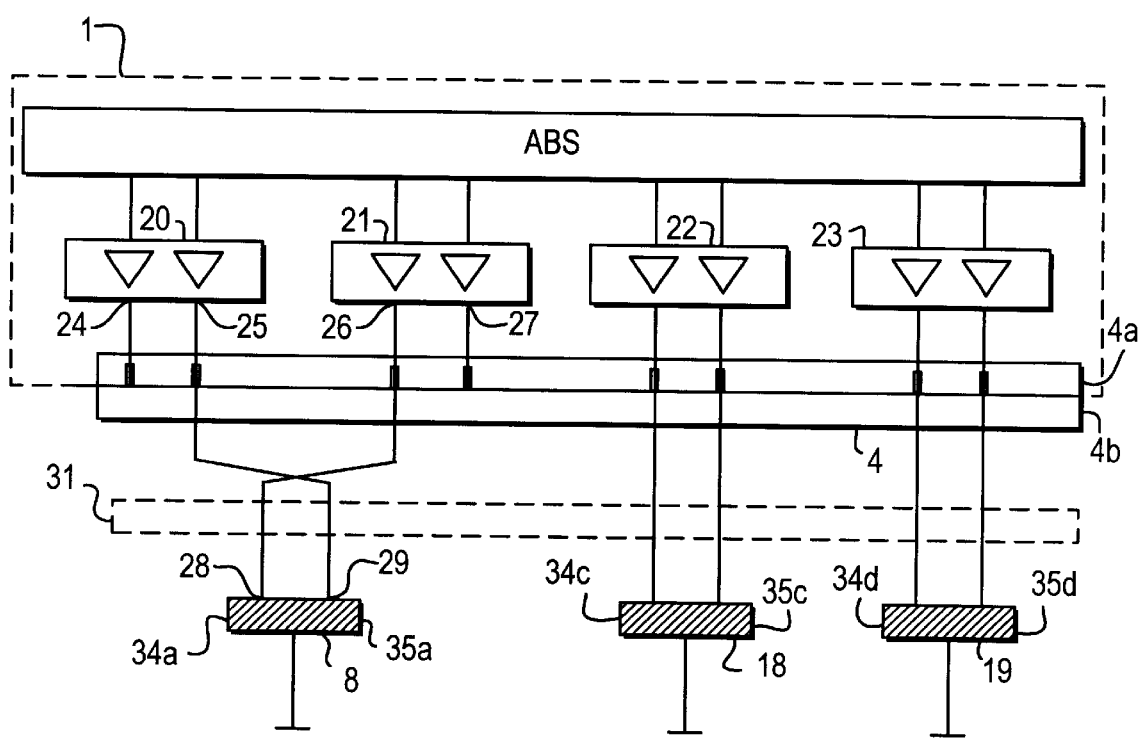
FIG. 5 illustrates, in block diagram form, the electronic component parts including end stages and modulators of a 4S/3M MAR ABS constructed according to the present invention.

Referring now to FIG. 5, a 4S/3M MAR ABS system is illustrated in block diagram form. The ABS system illustrated in FIG. 5 is the same as the system illustrated in FIG. 4, except that cable harness (31) is now wired to plug (4b) in such a way that the inlet valve 34a of the axle modulator (8) is coupled via its electrical inlet-valve lead (28) to inlet-valve output (26) of end stage (21) of the second channel of the front axle, and the outlet valve 35a of the axle modulator (8) is coupled via its electrical outlet-valve lead (29) to outlet-valve output (25) of end stage (20) of the first channel for the front axle. Leads (24) of end stage (20) (corresponding to the inlet valve) and (27) of end stage (21) (corresponding to the outlet valve) remain free.

This connection configuration is again recognized by ABS ECU (1), and the corresponding end stages (20, 21) are activated in such a way that proper regulation for axle modulator (8) is achieved, specifically as per the previously described MAR technique.

Accordingly, by virtue of the four completely installed end stages, the ABS electronic control unit of the present invention is suitable not only for the illustrated 4S/3M system, but also for regulation of 4S/4M and 4S/2M systems. Thus, there is no need to construct multiple versions of the ABS electronic control unit, and the inventory, production, warehousing and other costs of maintaining multiple versions are eliminated. Because of its uniform four-channel design, the present invention has more components (particularly end stages) than the known 4S/3M or 4S/2M models, which only contain two or three channels or end stages. However, the costs for the ABS electronic control unit of the present invention are on the whole reduced by the fact that larger quantities of only one electronic unit with a uniform component set can now be produced.

Accordingly, the present invention also provides an improved ABS electronic unit that eliminates the risk of an undetected improper matching of an ABS electronic control unit with an incompatible anti-lock braking system.

It should be noted that although the preferred embodiment is compatible with 4S/4M, 4S/3M and 4S/2M systems, it is readily apparent to one skilled in the art that the present invention may be applied to a wide variety of anti-lock braking systems with minor modification. The example of an ABS electronic control unit compatible with various two axle vehicles was intended to be illustrative, and not to limit the scope of the present invention in any way. For example, the present invention may be applied to ABS electronic control units designed for vehicles with more than two axles, or more than two wheels per axle.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An anti-lock braking system for a wheeled vehicle having at least two axles, wheel-speed sensors and at least one modulator per axle for adjustment of braking pressures, comprising an electronic control unit having four channels and four end stages, at least one axle of said at least two axles having a single one of said at least one modulator per axle for common control of the wheels on said at least one axle, said single one of said at least one modulator being commonly actuated by two end stages of the four end stages of said electronic control unit, and a coupler to couple the single one of said at least one modulator to said electronic control unit.

2. The anti-lock braking system of claim 1, wherein the single one of said at least one modulator is coupled to a front axle of said wheeled vehicle.

3. The anti-lock braking system of claim 1, wherein the single one of (said at least one modulator is coupled to a rear axle of said wheeled vehicle.

4. The anti-lock braking system of claim 1, wherein each modulator comprises an inlet valve and an outlet valve, and each of the end stages comprises a first amplifier for control of the inlet valve and a second amplifier for control of the outlet valve.

5. The anti-lock braking system of claim 4, wherein said coupler comprises at least one plug and at least one socket, said coupler being wired to permit said single one of said at least one modulator to be coupled by the inlet valve of said single one of said at least one modulator to the first amplifier of the end stage of a first channel corresponding to the at least one axle and to be coupled by the outlet valve of said single one of said at least one modulator to the second amplifier of the end stage of a second channel corresponding to the at least one axle.

6. The anti-lock braking system of claim 5, wherein the second amplifier of the first channel and the first amplifier of the second channel are not coupled to a modulator.

7. The anti-lock braking system of claim 5, wherein said coupler includes pin assignments, each of the end stages further comprising feedback lines for detecting the pin assignments of said coupler, said electronic control unit determining from the pin assignments of said coupler whether said electronic control unit is coupled to a valid anti-lock braking system.

8. The anti-lock braking system of claim 7, wherein said electronic control unit is programmed to control the anti-lock braking system with variable axle regulation if said electronic control unit determines that it is coupled to a variable axle regulation anti-lock braking system based on the pin assignments of said coupler.

9. The anti-lock braking system of claim 7, wherein said electronic control unit detects from at least one of the pin assignments of the coupler and the number of wheel-speed sensors the configuration of the anti-lock braking system to which the electronic control unit is coupled.

10. The anti-lock braking system of claim 9, wherein said electronic control unit transmits a warning signal if the electronic control unit fails to determine that it is connected to a valid anti-lock braking system.

11. The anti-lock braking system of claim 5, wherein said coupler includes pin assignments, said electronic control unit detecting said pin assignments of said coupler, and further determining from at least one of the pin assignments and the number of wheel-speed sensors the configuration of the anti-lock braking system to which the electronic control unit is coupled.

12. The anti-lock braking system of claim 11, wherein said electronic control unit transmits a warning signal if the electronic control unit fails to determine that it is connected to a valid anti-lock braking system.

13. The anti-lock braking system of claim 4, wherein said coupler comprises at least one plug and at least one socket, said coupler being wired to permit said single one of said at least one modulator to be coupled by the inlet valve of said single one of said at least one modulator to the first amplifier of the end stage of a second channel corresponding to the at least one axle and to be coupled by its outlet valve of said single one of said at least one modulator to the second amplifier of the end stage of a first channel corresponding to the at least one axle.

14. The anti-lock braking system of claim 13, wherein the first amplifier of the first channel and the second amplifier of the second channel are not coupled to a modulator.

15. The anti-lock braking system of claim 14, wherein said coupler includes pin assignments, said electronic control unit detecting from at least one of said pin assignments of the coupler and the number of wheel-speed sensors the configuration of the anti-system to which the electronic control unit is coupled.

16. The anti-lock braking system of claim 15, wherein said electronic control unit transmits a warning signal if the electronic control unit fails to determine that it is connected to a valid anti-lock braking system.

17. The anti-lock braking system of claim 13, wherein said coupler includes pin assignments, each of the end stages further comprising feedback lines for detecting the pin assignments of said coupler, said electronic control unit determining from the pin assignments of said coupler whether said electronic control unit is coupled to a valid anti-lock braking system.

18. The anti-lock braking system of claim 17, wherein said electronic control unit is programmed to control the anti-lock braking system with modified axle regulation if said electronic control unit recognizes that it is coupled to a modified axle regulation anti-lock braking system based on the pin assignments of said coupler.

19. The anti-lock braking system of claim 13, wherein said coupler includes pin assignments, said electronic control unit detecting from at least one of said pin assignments of the coupler and the number of wheel-speed sensors the configuration of the anti-lock braking system to which the electronic control unit is coupled.

20. The anti-lock braking system of claim 19, wherein said electronic control unit transmits a warning signal if the electronic control unit fails to determine that it is connected to a valid anti-lock braking system.

21. The anti-lock braking system of claim 1, wherein said coupler includes pin assignments and comprises at least one plug and at least one socket, each end stage comprising feedback lines that carry status signals from the end stages to the electronic control unit, said electronic control unit detecting the pin assignments of said coupler based on the status signals and determining the configuration of the anti-lock braking system based on the pin assignments.

22. The anti-lock braking system of claim 21, wherein said electronic control unit transmits a warning signal if the electronic control unit fails to determine that it is connected to a valid anti-lock braking system.

23. An anti-lock braking system for a wheeled vehicle having multiple axles, speed sensors and at least one modulator per axle coupled to at least one brake cylinder for controlling braking pressure, comprising an electronic control unit having multiple channels, each channel having at least one end stage selectively coupleable to the modulators for controlling the anti-lock braking system, and wherein for at least one axle, a single modulator controls braking pressure to the wheels on said at least one axle, said single modulator being commonly actuated by two end stages of the multiple channels.

24. The anti-lock braking system of claim 23, wherein each modulator comprises an inlet valve and an outlet valve and each of the end stages further comprises a first amplifier for the control of a respective inlet valve and a second amplifier for the control of a respective outlet valve.

25. The anti-lock braking system of claim 24, further comprising feedback lines for transmitting the status of the end stages to the electronic control unit.

26. The anti-lock braking system of claim 25, further comprising a coupler for coupling the modulators to the electronic control unit, wherein the coupler comprises at least one plug and at least one socket.

27. The anti-lock braking system of claim 26, wherein said coupler includes pin assignments, the electronic control unit determining at least one of the number of speed sensors that are coupled to the electronic control unit, the status of the end stages, and the pin assignments of the coupler.

28. The anti-lock braking system of claim 27, wherein the electronic control unit further comprises means for detecting if the electronic control unit is coupled to a valid anti-lock braking system.

29. The anti-lock braking system of claim 28, wherein the electronic control unit transmits a warning signal when at least one of an incompatible anti-lock braking system, an improper connection to the system, and an invalid system is detected.

30. The anti-lock braking system of claim 28, wherein the electronic control unit is programmed to use a modified axle regulation scheme when it detects that it is coupled to a modified axle regulation anti-locking braking system.

31. The anti-lock braking system of claim 28, wherein the electronic (control unit is programmed to use a variable axle regulation scheme when it detects that it is coupled to a variable axle regulation anti-locking braking system.

32. The anti-lock braking system of claim 28, wherein the electronic control unit is programmed to use an individual regulation scheme when it detects that it is coupled to an individual regulation anti-locking braking system.

33. The anti-lock braking system of claim 28, wherein the electronic control unit is programmed to choose between at least two anti-lock brake control schemes based on the type of anti-lock brake system to which it is coupled.

34. The anti-lock braking system of claim 24, wherein a first amplifier of a first end stage of two end stages activating the single modulator controls the inlet valve of said single modulator and a second amplifier of a second end stage of the two end stages controls the outlet valve of said single modulator.

35. An electronic control unit having multiple channels for controlling an anti-lock braking system including modulators, speed sensors, and means for coupling the modulators and speed sensors to the electronic control unit, wherein two channels of the multiple channels control a single modulator, the electronic control unit further comprising a programmable storage means including instructions for detecting the type of anti-lock braking system to which the electronic control unit is coupled, and instructions for selecting an anti-lock braking regulation scheme based on the detected type of anti-lock braking system.

36. The electronic control unit of claim 35, further comprising instructions for detecting whether the electronic control unit is coupled to a valid anti-lock braking system.

37. The electronic control unit of claim 36, further comprising means to transmit a warning signal when at least one of an incompatible anti-lock braking system, an improper coupling to the anti-lock braking system, and an invalid anti-lock braking system is detected.

38. The electronic control unit of claim 35, further comprising programmable storage means including instructions to use a modified axle regulation scheme when the electronic control unit detects that it is coupled to a modified axle regulation anti-locking braking system.

39. The electronic control unit of claim 35, further comprising programmable storage means including instructions to use a variable axle regulation scheme when the electronic control unit detects that it is coupled to a variable axle regulation anti-locking braking system.

40. The electronic control unit of claim 35, further comprising programmable storage means including instructions to use an individual regulation scheme when the electronic control unit detects that it is coupled to an individual regulation anti-locking braking system.

41. In a multi-axle wheeled vehicle having an electronic control unit for controlling an anti-lock braking system including modulators and speed sensors coupled to the electronic control unit, the electronic control unit including multiple channels, each channel having at least one end stage, a method for controlling the anti-lock braking system comprising the steps of using two channels of the electronic control unit to control a single modulator, detecting the type of anti-lock braking system to which the electronic control unit is coupled, and selecting an anti-lock braking regulation scheme based on the detected type of anti-lock braking system.

42. The method of claim 41, further comprising the step of causing the electronic control unit to detect if it is coupled to a valid and compatible anti-lock braking system.

43. The method of claim 42, further comprising the step of causing the electronic control unit to transmit a warning signal if at least one of an incompatible anti-lock braking system, an improper coupling to the anti-lock braking system, and an invalid anti-lock braking system is detected.

44. The method of claim 41, wherein the electronic control unit selects a modified axle regulation scheme if it detects that it is coupled to a modified axle regulation anti-locking braking system.

45. The method of claim 41, wherein the electronic control unit selects a variable axle regulation scheme if it detects that it is coupled to a variable axle regulation anti-locking braking system.

46. The method of claim 41, wherein the electronic control unit selects an individual regulation scheme if it detects that it is coupled to an individual regulation anti-locking braking system.

\* \* \* \* \*

UNITED STATES PATENT AND TRADEMARK OFFICE
Certificate

Patent No. 6,622,077 B2                                                       Patented: September 16, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gerhard Ruhnau, Neustadt (DE); Gerald Stanusch, Harsum (DE); Michael Knosmann, Hannover (DE).

Signed and Sealed this Eleventh Day of March 2008.

THOMAS G. BLACK
*Supervisory Patent Examiner*
Art Unit 3661